US006938370B2

(12) United States Patent
Johns (10) Patent No.: US 6,938,370 B2
(45) Date of Patent: Sep. 6, 2005

(54) ARBOR STAKE (76) Inventor: Milt Johns, 3 Copps Hill, Laguna Niguel, CA (US) 92677

( * ) Notice: Subject to any disclaimer, the term of this patent is extended or adjusted under 35 U.S.C. 154(b) by 0 days.

(21) Appl. No.: 10/742,148

(22) Filed: Dec. 19, 2003

(65) Prior Publication Data
US 2005/0132645 A1 Jun. 23, 2005

(51) Int. Cl.$^7$ ............................................. A01G 17/06
(52) U.S. Cl. .................. 47/42; 47/44; 47/47; 248/87; 248/156; 248/175; 248/530; 248/545
(58) Field of Search ............................. 47/42, 44, 40.5, 47/32.4, 32.5, 41.11, 43, 47, 45; 248/538, 248/27.8, 512, 87, 156, 175, 530, 545

(56) References Cited

U.S. PATENT DOCUMENTS

| | | | | |
|---|---|---|---|---|
| 492,520 A | * | 2/1893 | Hedges ........................ 52/156 |
| 601,691 A | * | 4/1898 | Watson ........................ 47/32.4 |
| 649,874 A | * | 5/1900 | Payne ........................ 47/41.11 |
| 917,655 A | * | 4/1909 | Pittman et al. ................ 47/47 |
| 933,112 A | * | 9/1909 | Rieman ........................ 47/47 |
| 948,672 A | | 2/1910 | Muller | |
| 959,789 A | * | 5/1910 | Nied ............................. 47/47 |
| 1,051,390 A | * | 1/1913 | Comstock ...................... 47/47 |
| 1,536,678 A | * | 5/1925 | Markowski .................... 47/47 |
| 1,536,679 A | * | 5/1925 | Markowski .................... 47/47 |
| 1,875,618 A | * | 9/1932 | Lenon ........................... 47/47 |
| 1,893,335 A | * | 1/1933 | Muller .......................... 47/44 |
| 1,916,305 A | | 7/1933 | Esselen | |
| 1,958,716 A | | 5/1934 | Roach et al. | |
| 2,603,439 A | * | 7/1952 | Le Vesconte ................ 108/28 |
| 3,136,510 A | * | 6/1964 | Bowers et al .............. 248/27.8 |
| 3,309,048 A | * | 3/1967 | Rousselet .................... 248/87 |
| 3,684,224 A | * | 8/1972 | Kwako ........................ 248/87 |
| 4,318,247 A | | 3/1982 | Lewis | |
| 5,473,839 A | * | 12/1995 | Stidham ........................ 47/47 |
| 6,487,816 B1 | * | 12/2002 | Wolter ........................... 47/47 |
| 2003/0066233 A1 | * | 4/2003 | Gunderman et al. ........... 47/45 |
| 2003/0132362 A1 | * | 7/2003 | Miller ........................ 248/530 |

FOREIGN PATENT DOCUMENTS

| | | | |
|---|---|---|---|
| CH | 0676905 | 3/1991 | |
| CH | 676905 | * 3/1991 | ............ A91G 9/12 |
| DE | 1582856 | 9/1969 | |
| GB | 13272 | 0/1914 | |
| GB | 2209111 | * 5/1989 | .......... A01G 17/12 |

* cited by examiner

Primary Examiner—Peter M. Poon
Assistant Examiner—Andrea M. Valenti
(74) Attorney, Agent, or Firm—Stetina Brunda Garred & Brucker (57) ABSTRACT A tree support stake having a base and a trunk. The base includes a plurality of tines extending horizontally and radially from a center of the base. Each of the tines includes a vertical portion extending downwardly at a periphery of the base. One end of the trunk is connected to the base and the other end extends upwardly to a predetermined height. The trunk comprises a plurality of upward vertical extensions joined together and extending upwardly at various elevations along the predetermined height, and a plurality of horizontal bars protruding perpendicularly from terminuses of the upward vertical extensions.

28 Claims, 5 Drawing Sheets

ARBOR STAKE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present application relates generally to a stake device for supporting, erecting, and anchoring a tree, and more particularly, to a tree support stake that provides a gradual flex limit to the tree and serves in its various configurations as a combination nursery stake, a supporting tension wire, and a landscape stake.

The current method of training young trees to grow in a straight, vertical orientation in the containerized ornamental nursery industry is to use a wooden nursery stake embedded in a growing medium disposed in a growing container. As the tree grows in its vertical dimension, the nursery operators band or tie the trunk of the growing tree to the nursery stake, effecting both etiolation of the trunk at the expense of maximum growth elongation of the same. As the tree grows progressively taller, it is banded at higher points along the nursery stake. As the tree reaches the terminus of the nursery stake and meets other key growth milestones such as minimum root mass, trunk girth, and height, the tree is either shifted to a larger container or is readied for sale to be transplanted into the ornamental landscape or other setting. Due to the nature of the cultivation of container-grown nursery trees where the trees are forced to maximize their rate of vertical growth, the resulting container-grown trees are often top-heavy and etiolated. To prevent container-grown trees from toppling in the wind in the nursery growing setting, the trees are typically attached to tension wires permanently affixed in the nursery setting. Upon installation of the containerized tree into an ornamental landscape setting, the nursery stake is removed from the tree and landscape stake (conventionally lodge poles and accessories) are used to secure and support the tree. The nursery stake is typically discarded after the installation as the sole intended function thereof is to serve in training and support the trunk of the tree during maturation in the container ready for market. However, the nursery stake is often mistakenly left on the tree and installed in the landscape together with the tree by both amateurs, and in due to oversight or haste, professional landscapers. Such a mistake is likely to compromise the desired growth of the tree transplanted into the landscape.

The transplanting of trees into the landscape is a task well known to those skilled in the art. The task basically includes the steps of digging a hole of sufficient size, placing the root ball of the tree within the hole, and back-filling the hole with soil. To ensure that nursery-grown trees are properly maintained in the desired upward orientation, and to allow for movement of the tree's trunk, a landscape stake and tree-tie system, or other tie and guying system is often used to direct such growth. Examples of conventional landscape stake and tie or guying systems include the lodge pole and tension wires as mentioned above. As known in the art, the more the trunk of the tree bends without breaking and without allowing too much bend such that the appearance of the tree in the ornamental landscape under wind loads does not appear to be compromised, the faster the strength and diameter of the trunk increases which also hastens the transition of the tree away from the need for the landscape stake. A common drawback of the conventional stake and tie or guying systems is that they severely limited flex, that is, the conventional landscape stake and tie system are typically too restrictive to provide sufficient tree flex and thereby retard proper tree growth.

Other concerns associated with the conventional stake and tie or guying system are the cost and the intensive labor required to install the same. With respect to the latter, the conventional stake and tie or guying system requires the installer to exercise great skill in connecting the support device to the tree. Incorrect tying such as tying the support device at a point too low along the trunk of the tree can cause the trunk of the tree to snap, while tying the support device at a point too high along the tree overly restricts flex movement of the trunk. The nature of conventional landscape stake (lodge pole) support methods occasionally does not provide sufficient anchoring of the tree thus allowing the tree to tip over during high wind condition. The nature of conventional staking methods also allows for chafing of the back surfaces due to abrasion against the lodge poles. The effectiveness of the conventional tree staking devices is subject to the supporting characteristics of the soil of ornamental installation. An example of lodge pole failure due to insufficient soil structure is the collapse of the poles into or towards the tree due to the pull of the tying device. Furthermore, most of the conventional stakes such as the lodge pole require specialized tools for installation—such devices are intrinsically dangerous in that the operation of the same may result in injuries to the users. Drawbacks such as trunk rub and/or damage upon lateral branches of the tree are also associated with the conventional support device due to maladjustment and shift thereof. In addition to the above, most of the prior art support devices occupy significant space around the tree in the landscape and are aesthetically unappealing due to their dominating appearance. The former characteristic causes great difficulty in some installation settings such as those that are narrow or confined by landscape elements such as concrete sidewalks, planter grates, asphalt parking lots, etc. Likewise, such devices can greatly interfere with the ability to maintain the landscape about the base of the tree (that is, mowing, line-trimming, weeding, and other chores).

Accordingly, there is a need to provide a support device that can initially or independently serve as the nursery stake for a container-grown tree, simultaneously serve as a substitute for the tension wires in the nursing environment, and finally serve as a landscape stake when the tree is transplanted into the landscape. Therefore, the replacement of the nursery stake is not required, nor is the need for the construction of infrastructure in the wholesale nursery such as tension wires, and the ArborStake used as the nursery stake is thus used in its other orientation as the landscape stake. As a result, the overall material and labor cost to stake the tree both in the nursery and in the landscape setting are significantly reduced. Further, the growth of the transplanted tree in the landscape will not be disturbed by the unremoved nursery stake.

There is also a need to provide a support device that is less expensive, easier and faster to install, reusable, more firmly embedded in the landscape, occupying less space, and less conspicuous than the conventional support device.

Additionally, there is a substantial need to provide a tree support device that provides a maximum and gradually increasing flex limit from the bottom to the top of the tree supported thereby, such that the growth of the tree is properly maintained at a desired upward orientation, while the strength and diameter of the trunk of the tree increases.

BRIEF SUMMARY OF THE INVENTION

The present invention specifically addresses and alleviates the above-identified deficiencies in the art. In this regard, there is disclosed a tree support stake having a base and a trunk. The base comprises of a plurality of elongate tines extending horizontally and radially outward from a center of the base. Each of the tines includes a vertical extension extending downwardly at a periphery of the base. One end of the trunk is connected to the base and the other end extends upwardly to a predetermined height. The trunk comprises a plurality of upward vertical extensions joined together and extending upwardly at various points along the predetermined height, and a plurality of horizontal bars protruding generally perpendicular from the end of the upward vertical extensions.

Preferably, the upward vertical extensions are made of flexible material such as metal in various configurations such as reinforcement bar (rebar), flat, round, angled, or square metal stock, heavy gauge wire, synthetics such as common plastic-type polymers and fiber glass. In one embodiment of the present invention, the stake device includes three tines, three downward vertical extensions and three upward vertical extensions. A first one of the upward vertical extension extends to the predetermined height, a second one of the upward vertical extension extends to two thirds of the predetermined height, and a third one of the upward vertical extension extends to one third of the predetermined height. Consequently, the horizontal bars protrude at one third, two thirds and full reach of the predetermined height, respectively. Further, the horizontal bar protruding at the predetermined height is bent to form a horizontal open loop.

One of the downward vertical extensions is preferably sized longer than the others to serve as root anchor of the stake device. Preferably, the longer downward vertical extension extends from the tine that is connected to the upward vertical extension extending to the predetermined height. When the tree is transplanted in landscape, the longer downward vertical extension is inserted through the root ball of the tree via the hole once occupied by the nursery stake and down into the soil.

When the stake device serves to stake a tree grown in a container, the tines rest on a top surface of the container, and the downward vertical extensions extend between an interior sidewall of the container and a root ball of the tree. The longer downward vertical extension extends through a drainage hole (as part of the conventional design of the container) in the bottom wall of the container into a medium such as soil on which the container is placed. Alternatively, the tines may be axially extended to allow the downward vertical extensions to extend downwardly along the outside of the container, such as to clasp an exterior sidewall of the container. Similarly, the longer downward vertical extensions extend under the container into the medium adjacent to the container.

The tines, the downward vertical extensions, and upward vertical extensions can be integrally formed by a conventional polymer molding process. The stake device can also be formed by individually formed tines, downward vertical extensions and upward vertical extensions joined together by various methods such as welding, clamping or gluing. Alternatively, some of the downward vertical extensions, the upward vertical extensions and the tines may be integrally formed, and then joined with the other individually fabricated members. For example, at least one of the tines may terminate with a loop, and one of the downward vertical extensions, preferably the longer downward vertical extension, may include a replaceable elongate root member inserted downwardly through the loop. The elongate root member includes a latch member at one end and a spike member at the other end. The latch member is engageable with the loop.

Each of the horizontal bars is preferably provided with a rubber or polymer tube to attach the device to the tree and to avoid damaging the tree by abrasion from the stake device. Preferably, one end of each tube extends over the corresponding horizontal bar. To stake the tree, the free ends of the tube are wrapped around the tree trunk. The free ends of the rubber tubes are then secured to the horizontal bars by tying members such as "zip" plastic or nylon ties. Similarly, when the trunk of the tree is disposed within the horizontal open loop formed at the terminus of the horizontal bar at the predetermined height, the open loop is closed by securing the rubber tube to the horizontal bar.

The present invention further provides a stake device for staking a tree that includes a "root" portion and a "trunk". The stake device includes a base and a trunk. The base comprises a plurality of tines radially extending along a horizontal plane and a downward vertical extension extending downwardly from each tine at a periphery of the base. The trunk has a proximal end connected to the tines about the center of the base and a distal end extending upwardly to a predetermined height. The trunk comprises a plurality of horizontal bars protruding perpendicularly at various points along the trunk. The trunk has a gradually reducing cross sectional area from the proximal end to the distal end. The trunk further comprises a horizontal loop protruding perpendicularly at the distal end of the trunk. In one embodiment of the present invention, the trunk includes a plurality of upward vertical extensions with various heights joined together, and the horizontal bars protrude perpendicularly from terminuses of the upward vertical extensions. One of the upward vertical extensions has the predetermined height, and the horizontal bar formed at the terminus thereof is bent to form the horizontal loop.

DETAILED DESCRIPTION OF THE INVENTION

Figure 1:
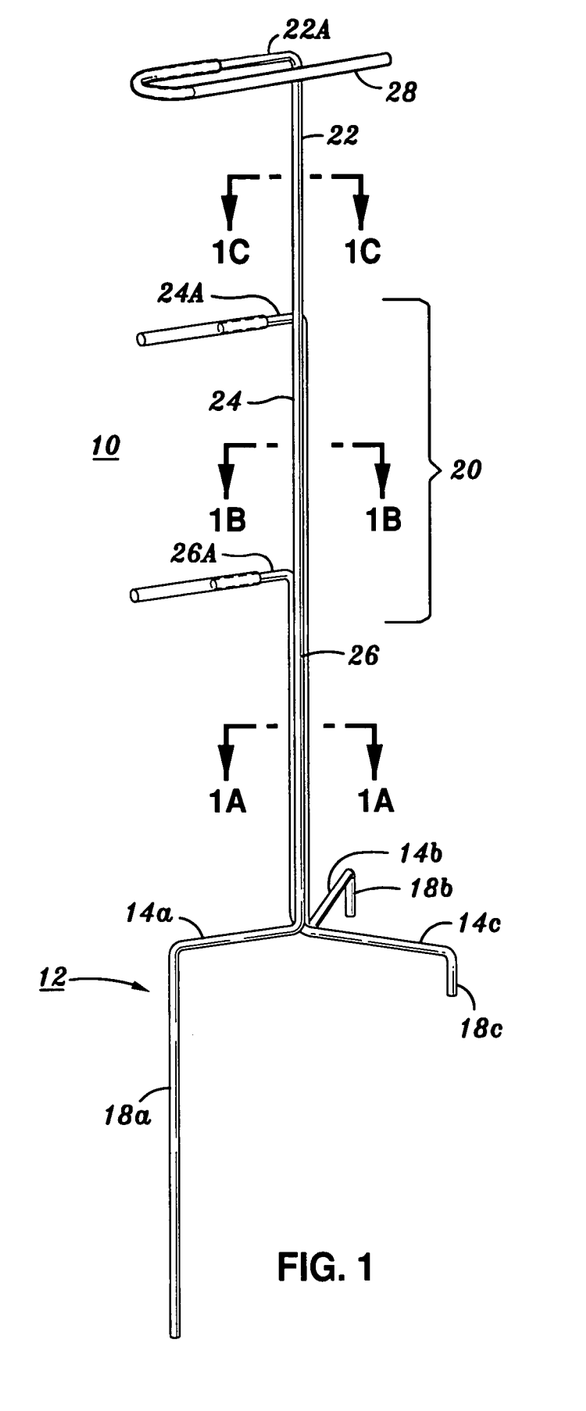
FIG. 1 depicts a perspective view of a stake device provided by the present invention.
Figure 2:
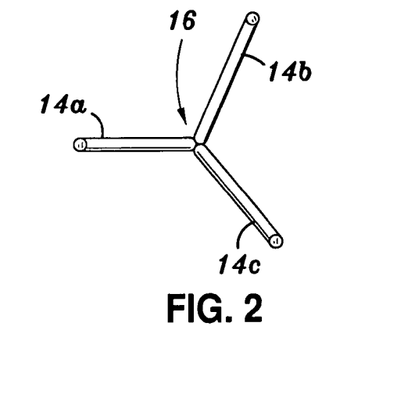
FIG. 2 shows a top view of a base of the stake device as shown in FIG. 1.
Figure 3:
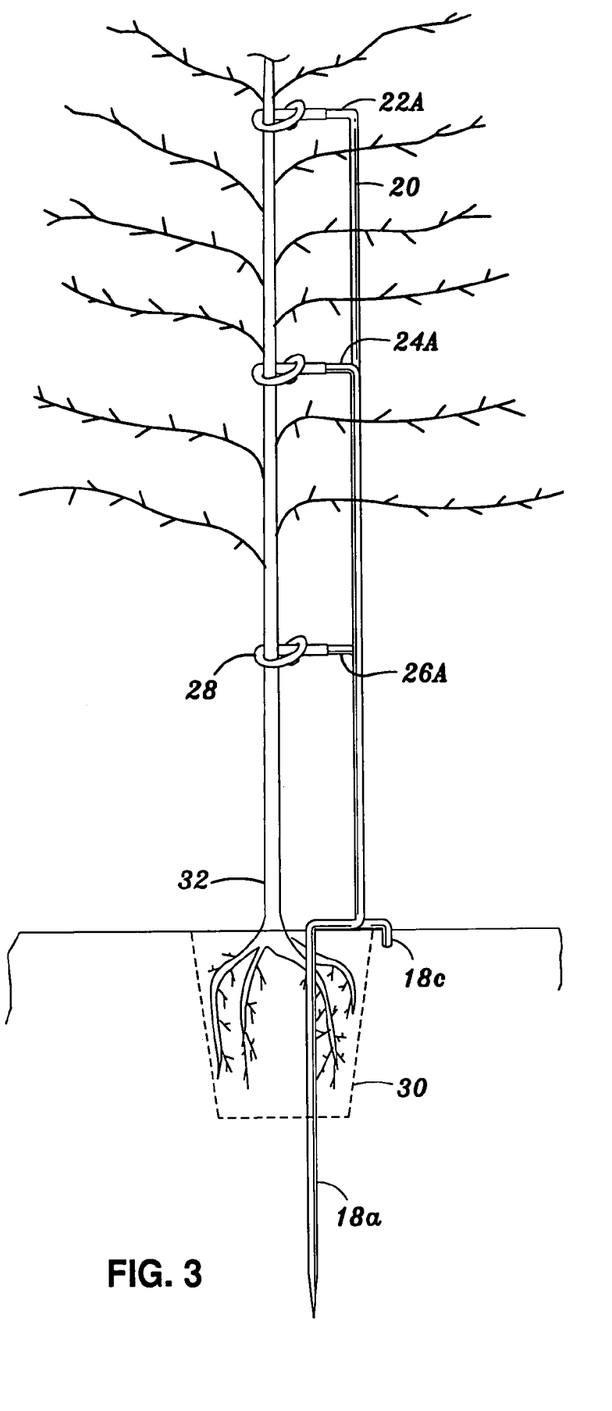
FIG. 3 shows a side view of the stake device staking a tree transplanted in landscape.

Referring now to the drawings wherein the showings are for purposes of illustrating a preferred embodiment of the present invention only, and not for purposes of limiting the same, there is shown in FIGS. 1–3 the tree support stake device 10 constructed in accordance with the present invention. As is well known to those skilled in the art, tree support devices must be used when a tree grown in a container is transplanted into the landscape. Such tree support devices provide upright support to the trunk of the tree transplanted into the landscape and maintain the same in the desired upward orientation while the root system of the tree develops and becomes embedded within the native soil and while the diameter of the tree trunk increases to a point that it has the strength to support the tree.

Various sized containers have been used to contain different types of nursery-grown trees. To ensure that such nursery-grown trees are properly maintained in the desired upright orientation in their containers, support stakes or nursery stakes are often used. Typically, these stakes are positioned close to the trunk of the tree and are positioned such that the stake extends substantially downward into the root ball. Unfortunately, nursery staking can produce the undesirable condition of etiolation or weakening of the conductive/supportive tissue of the tree trunk, which often causes the tree to have a tendency to bend in the direction away from the stake, or to be unable to support itself once the stake is removed from the tree.

As best illustrated in FIG. 1, the stake device 10 of the present invention comprises a base 12 and a trunk portion 20. The base 12 is constructed of plural, preferably three tines 14a, 14b, and 14c which extend horizontally and radially outward from a center 16 of the base 12 to provide improved stabilization from 360°. The center 16 is best illustrated in a top view of the base 12 as shown in FIG. 2. Preferably, the tines 14a to 14c emanating from the center 16 are radially spaced from each other by the same angle. In this embodiment, as the base 12 includes three tines 14a to 14c, the angle between the adjacent tines 14a to 14c is 120°. The trunk 20 includes three vertical extensions 22, 24 and 26 extending axially upward from the tines 14a, 14b and 14c at the common center 16, respectively. The vertical extensions 22, 24 and 26 include plural horizontal bars 22A, 24A and 26A protruding generally perpendicularly at the terminuses thereof, respectively. In this embodiment, the upward vertical extension 24 extends to about two thirds of the height of the upward vertical extension 22, and the upward vertical extension 26 extends to about one third of the height of the upward vertical extension 22. Therefore, three tree attaching points are formed at three different vertical levels for attaching the tree to the stake 10. Each of the horizontal bars 22A, 24A and 26A is preferably encased with a replaceable rubber tube 28. The tubes 28 encasing the horizontal bars 22A, 24A and 26A serve to attach the tree to the stake 10. In addition, the tubes 28 also protect the tree from being damaged by abrasion of the horizontal bars 22A, 24A and 26A. Note that the rubber tube 28 is preferably made from a post-industrial recycled material.

The tines 14a to 14c preferably further include downward vertical extensions 18a, 18b and 18c, respectively. As shown in FIG. 1, the downward vertical extension 18a is longer than the downward vertical extensions 18b and 18c to serve as an anchor of the tree by way of anchoring the root ball of the tree. In the embodiment as shown in FIG. 2, the tine 14a including the longer downward vertical extension 18a is formed having a length shorter than that of the tines 14b and 14c, and the longer downward vertical extension 18a extends from the same tine 14a that has the highest upward vertical extension 20. It will be appreciated that the lengths of the tine 14a, 14b and 14c may be altered according to specific requirement without exceeding the spirit and scope of the present invention.

Figure 1A:
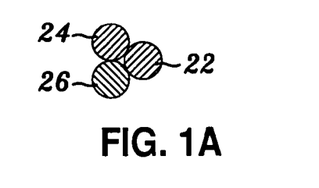
FIGS. 1A to 1C show the cross sectional views at various locations of the stake device as shown in FIG. 1.
Figure 1B:
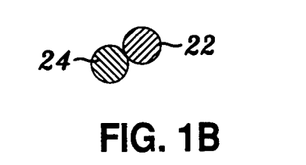
Figure 1C:
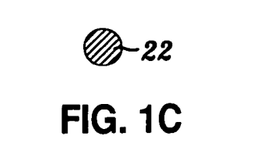

The upward vertical extensions 22, 24 and 26 are preferably bundled together by tying member, gluing or welding. A molding or casting process can also be provided allowing the trunk 20, including the upward vertical extensions 22, 24 and 26, and the base 12 to be integrally formed. In one embodiment, three bars with the specific lengths may be bent or formed with the required configurations and joined together to form the stake device 10, or three bars may be partially joined together first and bent into the required configurations afterwards. FIGS. 1A, 1B, and 1C show the cross sectional views of the trunk 20 at various heights along the trunk 20. In this embodiment, each of the upward vertical extensions 22, 24 and 26 has a round cross section. It will be appreciated that according to specific requirement, the upward vertical extensions 22, 24 and 26 may be formed with various cross sectional configurations. For example, as most of the conventional nursery stakes used for supporting and anchoring the container-grown tree provide flat surfaces for the tree to grow along, square bars and/or other conventional metal forms such as angle-stock may be used for fabricating the upward vertical extensions 22, 24 and 26.

When the stake 10 is applied to support and anchor a tree transplanted into landscape, as shown in FIG. 3, the extension 18a, having the longest downward vertical extension is axially inserted through the root ball 30 of the tree, while the tines 14a to 14c preferably rest on the root ball 30, and the other downward vertical extensions 18b and 18c are inserted into landscape's soil to provide additional horizontal stability for securing the stake 10 therein. For staking a tree previously supported by the nursery stake, the extension 18a is designed and configured to be axially inserted through the hole previous formed by the nursery stake, so that damage upon the root ball 30 of the tree can be minimized. Alternatively, the extension 18a may also insert through any portion of the root ball proximate to the trunk 32, for example, no more than 2 inches from any point from the trunk 32. As shown in FIG. 3, preferably, one end of the tubes 28 extends over the terminuses of the horizontal bars 22A, 24A and 26A with a sufficient length to wrap around the trunk 32. The extending ends of the tubes 28 are then secured to the horizontal bars 22A, 24A and 26A by tying members such as cable or "zip ties".

To achieve the desired physiological effect to thus counter the effects of etiolation that occur in nursery-grown trees using conventional nursery container staking, the stake 10 of the present invention is fabricated from flexible materials well known to those skilled in the art. In this regard, such flexible materials are necessary to enable the tree to bend and move under varying wind conditions. Such bending and moving cause the conductive/supportive tissues of the tree and more particularly the cells that comprise the same, to shorten and thicken. As a result, the trunk 32 of the tree becomes stronger, as well as increases in diameter and taper. The materials best suited for fabricating the stake 10 of the present invention is ⅜" to ½" metal and larger diameter, fiber glass, or polymer reinforcement bar (rebar) or heavy gauge metal wire that is bent and welded, formed, or cast into the configurations disclosed therein. Varying diameters of materials may be used in fabricating the stake 10 and the upward vertical extensions 22, 24, and 26; i.e., ⅜" diameter material may be used for the extension 22, and ½" material used for the extensions 24 and 26.

As shown in FIGS. 1A to 1C and 3, at one third of the vertical portion of the stake 10, three pieces of the upward vertical extensions 22, 24, and 26 are joined together to tie the tree trunk 32 thereto. At two thirds of the vertical portion, two pieces of the upward vertical extensions 22 and 24 are joined together to tie the tree trunk 32 to the stake 10. Up to the entire length of the vertical portion, only one upward vertical extension 22 remains for restricting the tree trunk 32 moving in the loop formed thereby. As a result, the combined cross sectional areas of the vertical portion vary in axial length to vary the amount of horizontal flexing movement along the length of the stake. Thus, the allowable horizontal flex movement of the bottom of the tree trunk 32 is restricted to only one third of that at the top thereof, and the allowable horizontal flex movement of the middle portion of the tree trunk 32 is restricted to two thirds of that at the top of the tree trunk 32. Consequently, the flex limit of the tree trunk 32 gradually increases from the bottom to the top thereof. A maximum flex in the upper portion of the tree is thus obtained while the bottom portion thereof is adequately stabilized. In a high wind condition, the tree is thereby allowed to flex without tilting and bending to a degree that may be perceived as precariously off center, nor compromising the integrity of the tree.

In the aforementioned embodiment as shown in FIGS. 1 and 3, the stake 10 comprises three tines 14a to 14c, three upward vertical extensions 22, 24, and 26 extend upwardly from the respective tines 14a to 14a at various heights, and three downward vertical extensions 18a to 18c extending downwardly from the tines 14a to 14c. It will be appreciated that the number of the tines, the upward vertical extensions and the downward vertical extensions can be adjusted according to specific requirements without exceeding the scope and spirit of the present invention. In addition, the specific lengths and diameters of the horizontal bars 22A, 24A, 26A and the downward vertical extensions 18a to 18c can also be adjusted according to the size of the tree to be staked thereby.

In FIG. 3, the stake 10 is applied as a landscape stake to support and anchor a tree transplanted in landscape. It is appreciated that such stake 10 can also serve as a nursery stake for a container-grown tree. That is, the stake 10 can be used as the nursery stake while the tree is growing in a container, and further used as the landscape stake when the tree is transplanted into the landscape. Further, the stake also provides the function of the tension wires often equipped in the nursery growing setting or yard.

Figure 4:
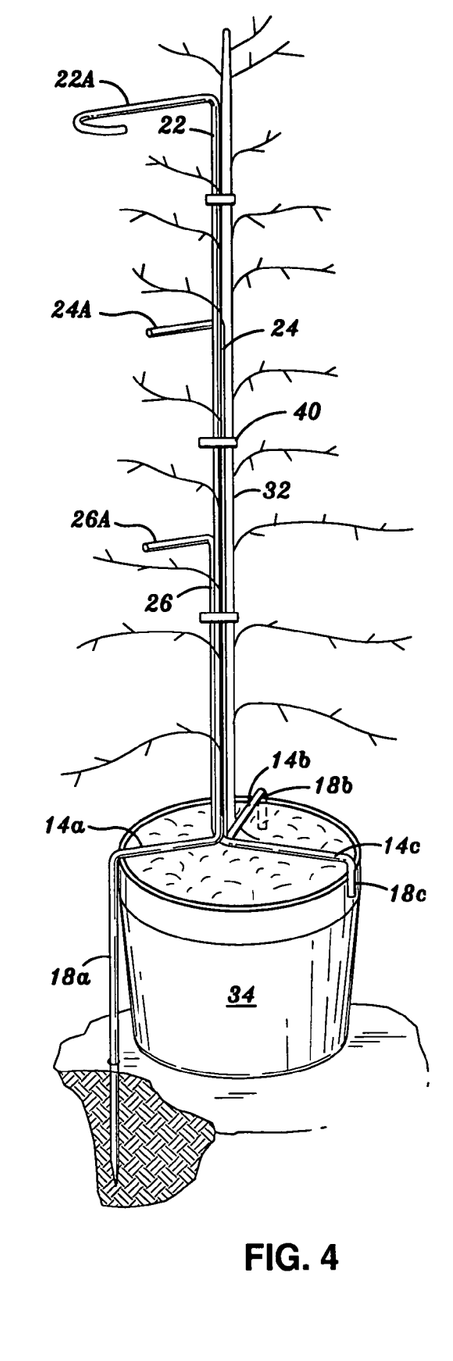
FIG. 4 shows a perspective view of the stake device staking a container-grown tree.

To serve as the nursery stake for a container-grown tree, as shown in FIG. 4, the tine 14a is shortened in radial length to allow the vertical extension 18a extending therefrom to be inserted into the soil located outside of the container 34. The extension 18a preferably has a length longer than height of the container 34. In this embodiment, all of the tines 14a, 14b and 14c are sized to extend over the lateral edge or periphery of the container 34, such that the downward vertical extensions 18a to 18c extend downwardly to contact the exterior sidewall of the container 34 and effectuate the securing of the stake 10 to the container 34. Preferably extension 18a is sized to extend downwardly into the nursery soil adjacent to the container 34 by a few inches lower than the container 34. The stake 10 thus supports and stabilizes the tree in the container 34 in the nursery yard.

As shown in FIG. 4, when the stake 10 serves as a nursery stake for a container-grown tree, with respect to the application of the landscape stake as shown in FIG. 3, the stake 10 is preferably rotated 180 degrees allowing the tree to grow along the vertical portion of the stake 10 while the protruding horizontal bars 22A, 24A, and 26A extend away from the tree. Therefore, the horizontal bars 22A, 24A, and 26A can be advantageously used as handles for loading, unloading, or transporting the tree in the nursery and in the landscaping setting. The tree can also be secured to the stake 10 by tie members 40 at various positions along the tree trunk 32.

Figure 5:
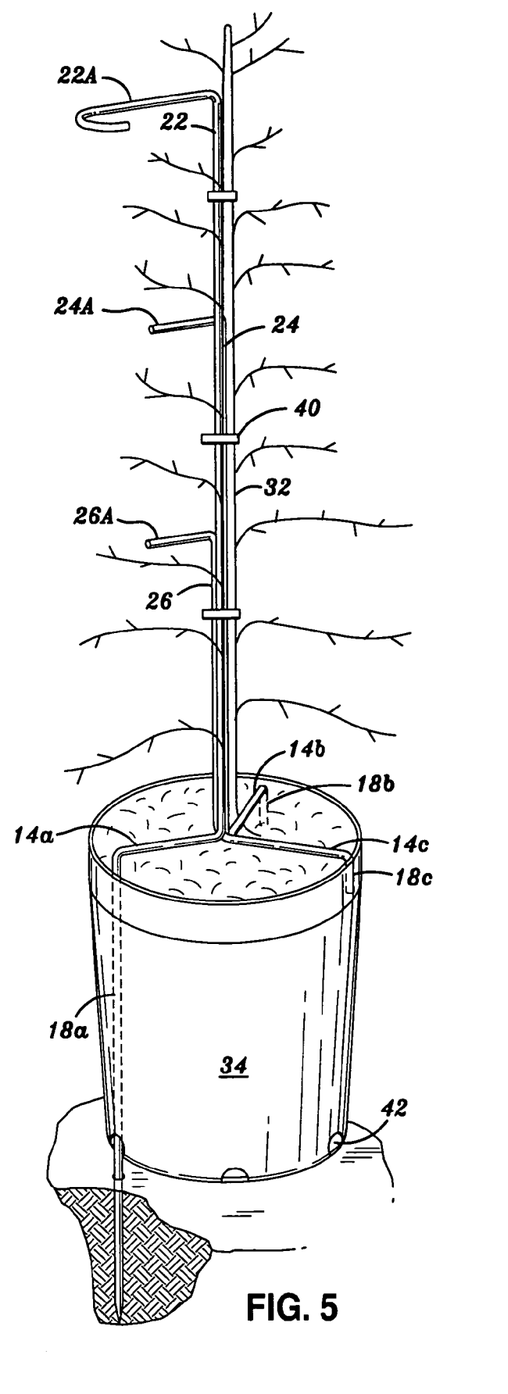
FIG. 5 shows another embodiment of the stake device for staking a container-grown tree.

In another embodiment of the present invention as shown in FIG. 5, all of the tines 14a to 14c are sized with the lengths allowing the downward vertical extensions 18a to 18c to extend downwardly between the root ball 30 and the interior sidewall of the container 34, and the downward vertical extensions 18a is sufficiently long to extend through the drainage holes 42 formed on the bottom wall of the container 34 by several inches into the soil to a depth sufficient to secure the tree from toppling due to winds.

As is well known in the art, nursery-grown trees are generally grown in one of several standard containers. In this regard, such trees are typically grown in either 5 or 15 gallon containers or 24", 30", 36" or 48" boxes or any variations thereof. Therefore, the tree stake devices will preferably be configured to have dimensions compatible with such conventional sizes of containers, or sizes of variations of the standard containers. For example, to stake a tree grown in a 15 gallon container, the upward vertical extension 20 in FIG. 1 is preferably 60 inches high, and the upward vertical extensions 22 and 24 are 40 inches and 20 inches high, respectively. The preferred length of the horizontal bars 24A and 26A is about 6 inches, and the preferred length of the horizontal bar 22A is preferably about 7 inches. The lengths of the tines 14a, 14b and 14c are all about 6 inches. The downward vertical extension 18a extends with a length of about 28 inches. It will be appreciated that the preferred lengths as disclosed here are not for purpose of limiting the present invention, and the dimensions of the stake can be modified according specific requirements.

Figure 6:
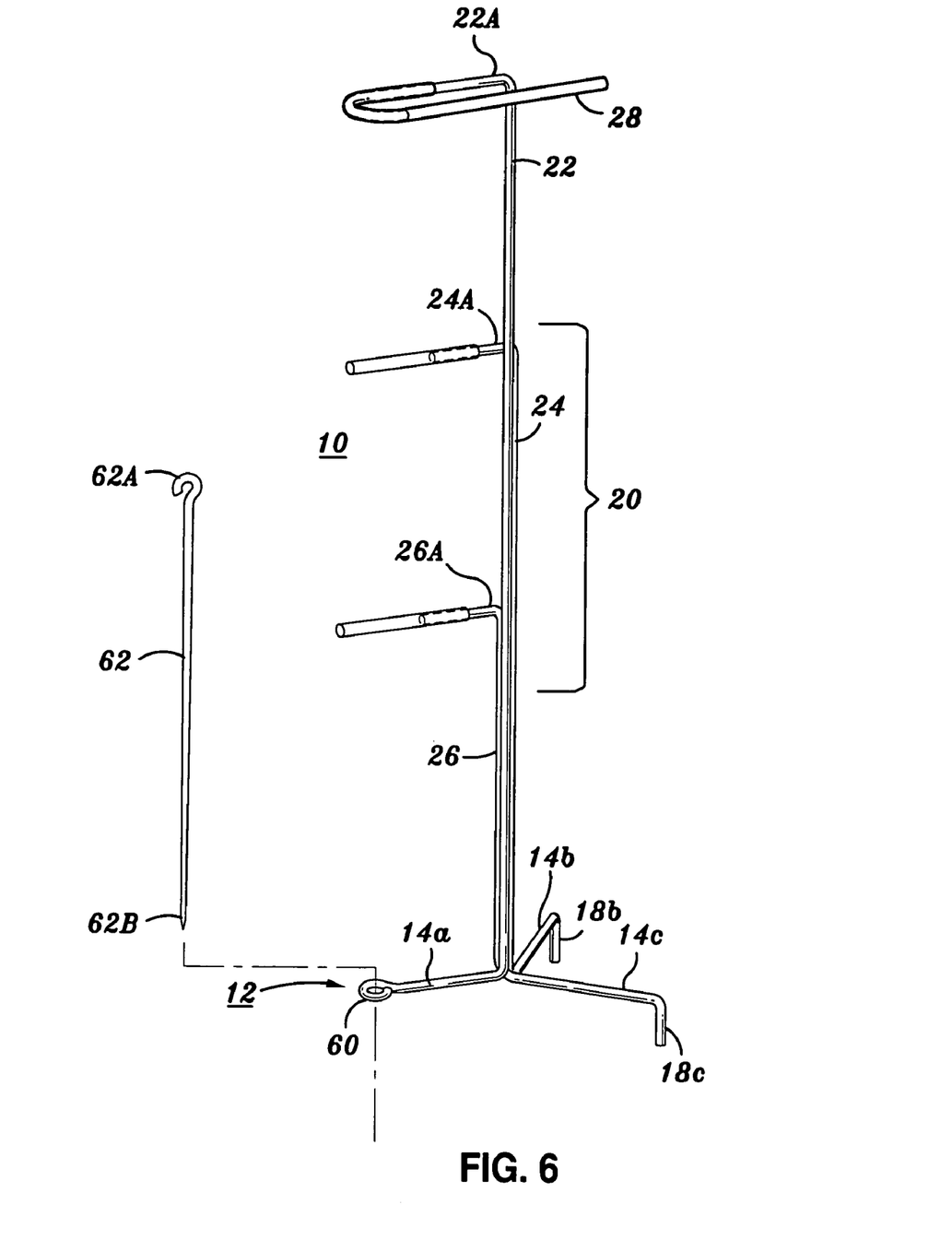
FIG. 6 shows another embodiment of the stake device provided by the present invention.

In FIG. 6, the terminus of the horizontal tine 14a is bent to form a loop 60, and the downward vertical extension 18a as illustrated in the previous embodiments is replaced by a removable elongate member 62. As shown, the proximal end of the elongate member 62 includes a hook 62A, while the distal end of the elongate member 62 includes a spike 62B. When the tines 14a to 14c are resting on the root ball 30 of the tree as shown in FIG. 3, or on the top surface of the container 34 as shown in FIGS. 4 and 5, the elongate member 62 is inserted through the loop 60 with the hook 62A engaged with the loop 60 and the spike 62B inserted into the root ball 30 and/or soil. Therefore, the application of the stake device is more flexible to meet the particular user preferences in the industry. As specifically required, other tines 14b and 14c may also be modified in the same manner to further increase the flexibility of application. Moreover, the tines 14a to 14c may be fabricated with sufficient lengths with more than one latching structures thereon. By providing a variety of elongate members with one end engageable with the latching structures and spikes at the other end, the application of the stake device will not be restricted to dimensions and configurations of the containers for containing the tree.

Figure 7:
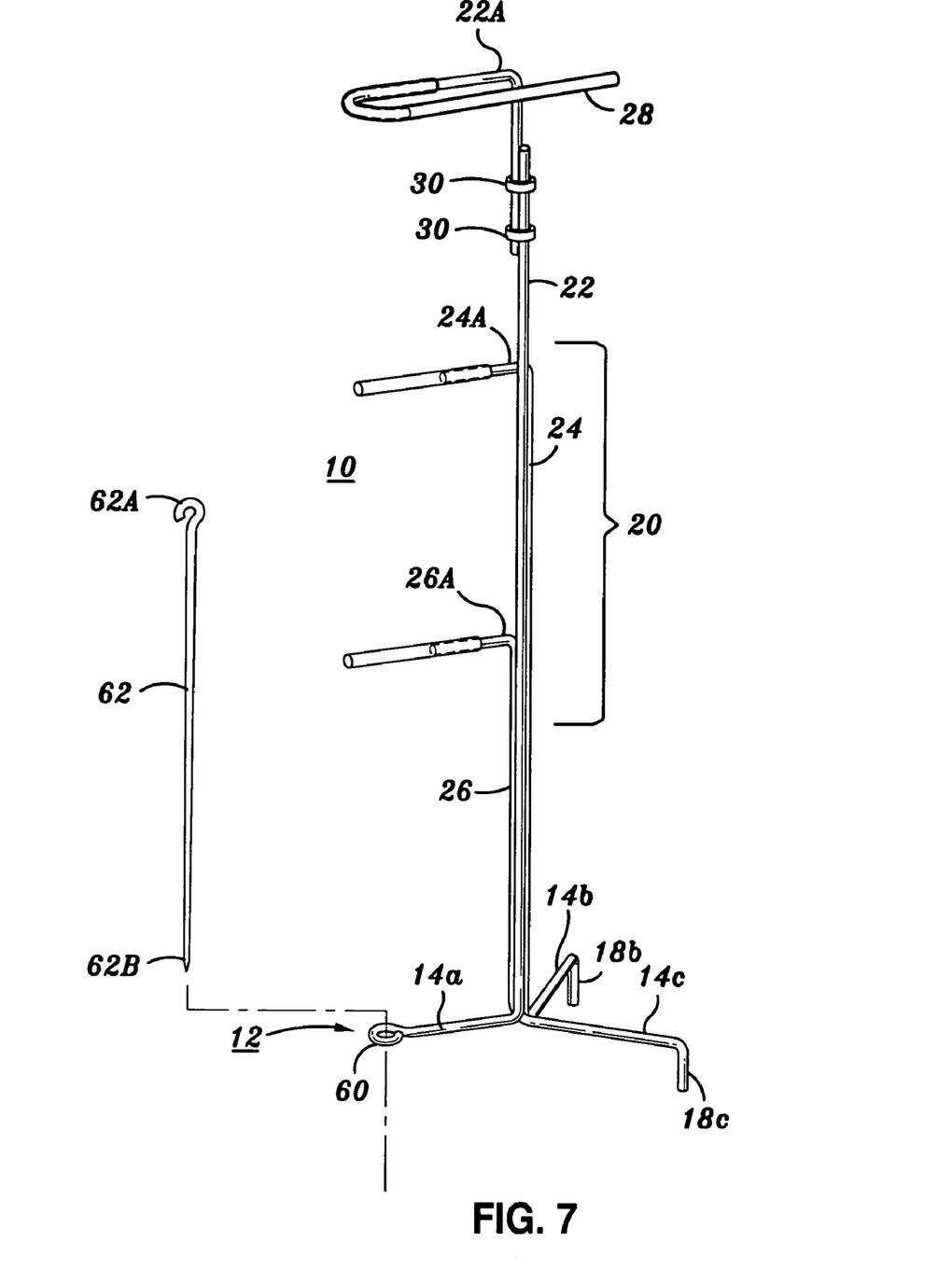

FIG. 7 shows a further improvement of the ArborStake provided by the present invention. As shown in FIG. 7, the upward extension 22 includes an elongate member along the vertical direction only, while the horizontal bar 22A includes a vertical extension extending vertically and partially overlapped and connected with the vertical extension 22 by connectors 30. By adjusting the overlapped portion of the vertical extension 22 and the vertical extension of the horizontal bar 22A, the level of the horizontal bar 22A; and consequently, the overall height of the stake is adjusted.

Preferably, the connectors 30 are selected from those structures which allow the vertical extension of the horizontal bar 22A to be telescoped relative to the vertical extension 22.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A stake device for staking a tree, comprising:
    a base, comprising:
        a plurality of horizontal tines radially extending from a center of the base; and
        a plurality of downward vertical extensions connected to respective ones of the tines and extending downwardly at a periphery of the base, a first one of the downward vertical extensions extending substantially longer than the remaining ones of the downward vertical extensions; and
    a trunk extending upwardly from the base to a predetermined height, the trunk comprising:
        a plurality of upward vertical extensions joined together along a predetermined vertical height and having first ends connected to the respective ones of the tines about the center of the base and second ends extending upwardly at various points along the predetermined height, a first one of the upward vertical extensions extending to the predetermined height, the remaining one of the upward vertical extensions extending to a height no greater than about two thirds of the predetermined height and no less then one third of the predetermined height; and
        a plurality of horizontal bars protruding perpendicularly from the second ends of the upward vertical extensions;
        wherein the first one of the downward vertical extension extends from the tine that is connected to the first one of the upward vertical extensions.

2. The stake device of claim 1, wherein the trunk is made of flexible material.

3. The stake device of claim 1, wherein the upward vertical extensions are made of reinforcement bars, metal stocks, plastic polymer, fiber glass or heavy gauge stock wires.

4. The stake device of claim 1, wherein the base comprises three tines and three downward vertical extensions, and the trunk comprises three upward vertical extensions and three horizontal bars.

5. The stake device of claim 4, wherein the first one of the upward vertical extensions extends to the predetermined height, a second one of the upward vertical extensions extends to two thirds of the predetermined height, and a third one of the upward vertical extensions extends to one third of the predetermined height.

6. The stake device of claim 1, wherein when the tree is transplanted into landscape, the first one of the downward vertical extensions is inserted through a pre-existing void created in the root ball of the tree.

7. The stake device of claim 1, wherein the the first one of the downward vertical extensions is inserted into a root portion of the tree within a distance to a trunk of the tree no more than 2 inches.

8. The stake device of claim 1, wherein when the tree is growing in a container, the tines rest on a top surface of the container, and the downward vertical extensions extend between an interior sidewall of the container and a root ball of the tree.

9. The stake device of claim 8, wherein the first one of the downward vertical extensions extend through a bottom drainage hole of the container.

10. The stake device of claim 1, wherein when the tree is growing in a container, the tines rest on a top surface of the container, and the downward vertical extensions clasp an exterior sidewall of the container.

11. The stake device of claim 10, wherein one of the downward vertical extensions extend into a medium on which the container is placed.

12. The stake device of claim 1, further comprising a plurality of rubber tubes for encasing the horizontal bars of the upward vertical extensions.

13. The stake device of claim 12, wherein one ends of the rubber tubes extend over the horizontal bars with lengths sufficient to wrap around the tree.

14. The stake device of claim 13, further comprising a plurality of tying members to secure the rubber tubes to the horizontal bars.

15. The stake device of claim 14, wherein the tying members include zip ties.

16. The stake device of claim 1, wherein a terminus of the horizontal bar protruding from the first one of the upward vertical extensions is bent to form a horizontal open loop.

17. A stake device for staking a tree including a root portion and a trunk, the stake device comprising:
    a plurality of tines emanating about a center and radially extending along a horizontal plane, each one of the tines terminating in a terminus, the terminus of at least one of the horizontal tines including a loop;
    a plurality of downward vertical extensions extending downwardly from the terminuses of the respective tines, a first one of the downward vertical extensions comprising a removable elongate member inserted through the loop and extending substantially longer than the remaining ones of the downward vertical extensions; and
    a trunk, having one proximal end and one distal end, the trunk comprising a plurality of upward vertical extensions connected to corresponding ones of the tines and extending upwardly to a predetermined height, the vertical extensions joined together along a predetermined vertical height, the first one of the downward vertical extensions extends from the tine that is connected to the upward vertical extension that extends to the highest predetermined height of all of the upward vertical extensions, the trunk comprising a plurality of horizontal bars protruding perpendicularly at various points along the trunk, each one of the horizontal bars being formed as a unitary structure in combination with a corresponding one of the upward vertical extensions and a corresponding one of the tines, the trunk has a gradually reducing cross sectional area from the proximal end to the distal end.

18. The stake device of claim 17, wherein the trunk further comprises a horizontal loop formed at the distal end of the trunk.

19. The stake device of claim 17, wherein the plurality of upward vertical extensions extend upwardly to various heights and being joined together.

20. The stake device of claim 19, wherein the horizontal bars protrudes perpendicularly from terminuses of the upward vertical extensions.

21. The stake device of claim 19, wherein one of the upward vertical extensions includes one of the horizontal bars formed at the terminus thereof, the horizontal bar is bent to form a horizontal loop.

22. The stake device of claim 17, further comprises a horizontal loop and a vertical extension extending perpendicularly and downwardly from the horizontal loop, the vertical extension being bundled with the trunk by a pair of connectors.

23. The stake device of claim 22, wherein the vertical extension is telescopically connected to the distal end of the trunk.

24. A stake device suitable for staking a tree in both a landscape and a container, comprising:
- a trunk including a plurality of upward vertical extensions extending upwardly to a predetermined height and being joined together along a predetermined vertical height, a first one of the upward vertical extensions extending to the predetermined height, a second one of the upward vertical extensions extending to about two thirds of the predetermined height, and a third one of the upward vertical extensions extending to about one third of the predetermined height;
- a plurality of horizontal bars extending perpendicularly from a first side of the trunk at various heights, the ends of each one of the horizontal bars being at least partially encased in rubber tubing extending beyond the ends of the horizontal bars with free ends of the tubing being configured to be wrapped around the tree trunk and being secured to the horizontal bars by tying members for tying the tree positioned at the first side of the trunk;
- a plurality of horizontal extensions radially emanating from the bottom of the trunk; and
- a plurality of downward vertical extensions extending downwardly from terminuses of the horizontal extensions, a first one of the downward vertical extensions extending substantially longer than the remaining ones of the downward vertical extensions;

wherein the first one of the downward vertical extension extends from the horizontal extension that is connected to the first one of the upward vertical extensions.

25. The stake device of claim 24, further comprising a plurality of tie members for tying the tree to a second side of the trunk, wherein the second side is opposing to the first side.

26. The stake device of claim 24, further comprising a plurality of tie members for tying the tree growing in the container to a second side of the trunk, wherein the second side is opposite to the first side.

27. The stake device of claim 24, wherein one of the vertical extensions extend downwardly into soil on which the container is disposed.

28. The stake device claim 24, wherein one of the vertical extensions extend through a drainage hole of the container into soil on which the container is disposed.

* * * * *